Sept. 30, 1969 D. L. MILLER ET AL 3,469,742
FERTILIZER PLANT
Original Filed Oct. 23, 1965 5 Sheets-Sheet 1
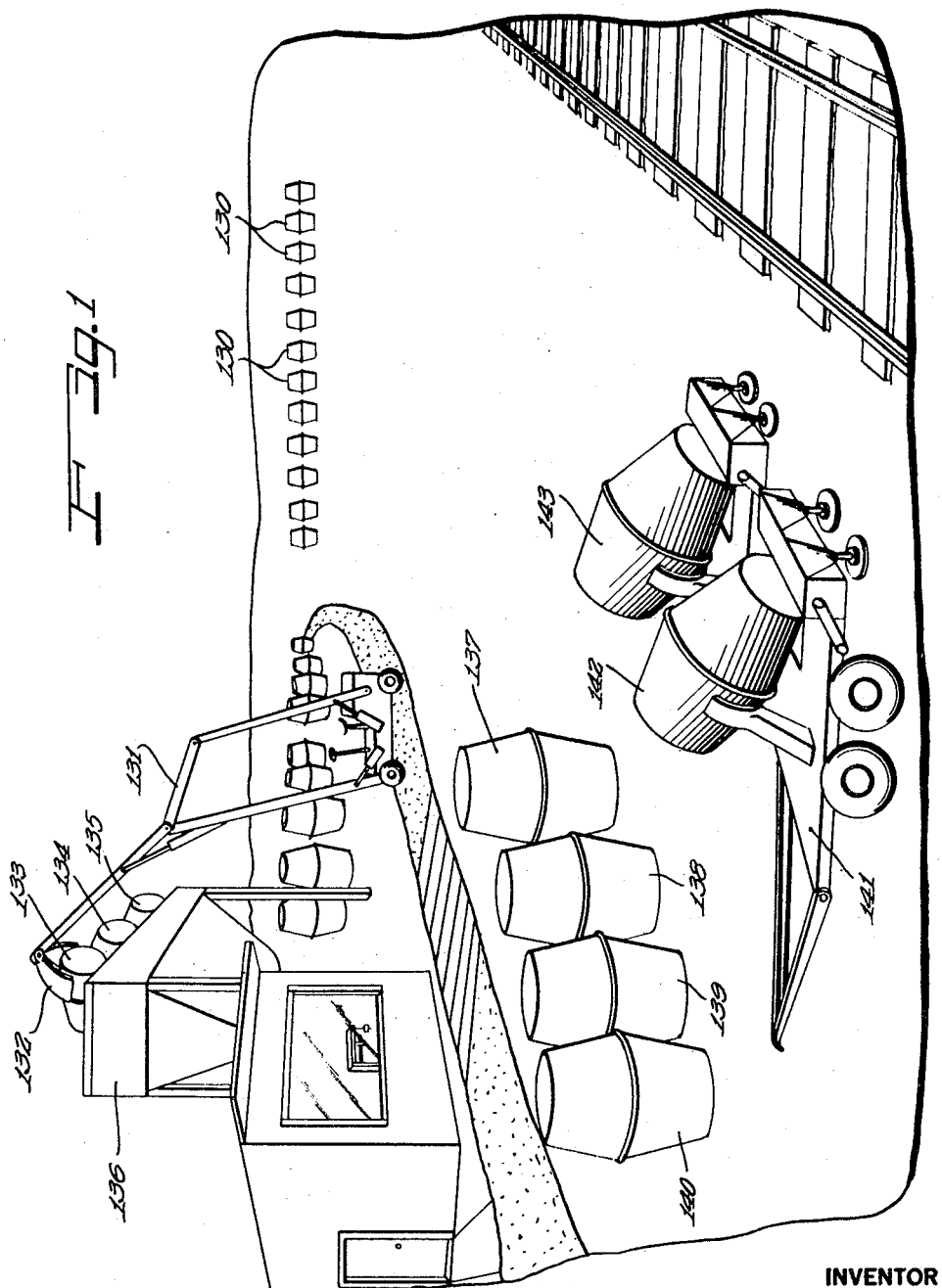
INVENTOR
Donald L. Miller
James H. Paul
Sherman W. Kavanaugh
BY
Hill, Sherman, Meroni, Gross & Simpson ATTORNEY

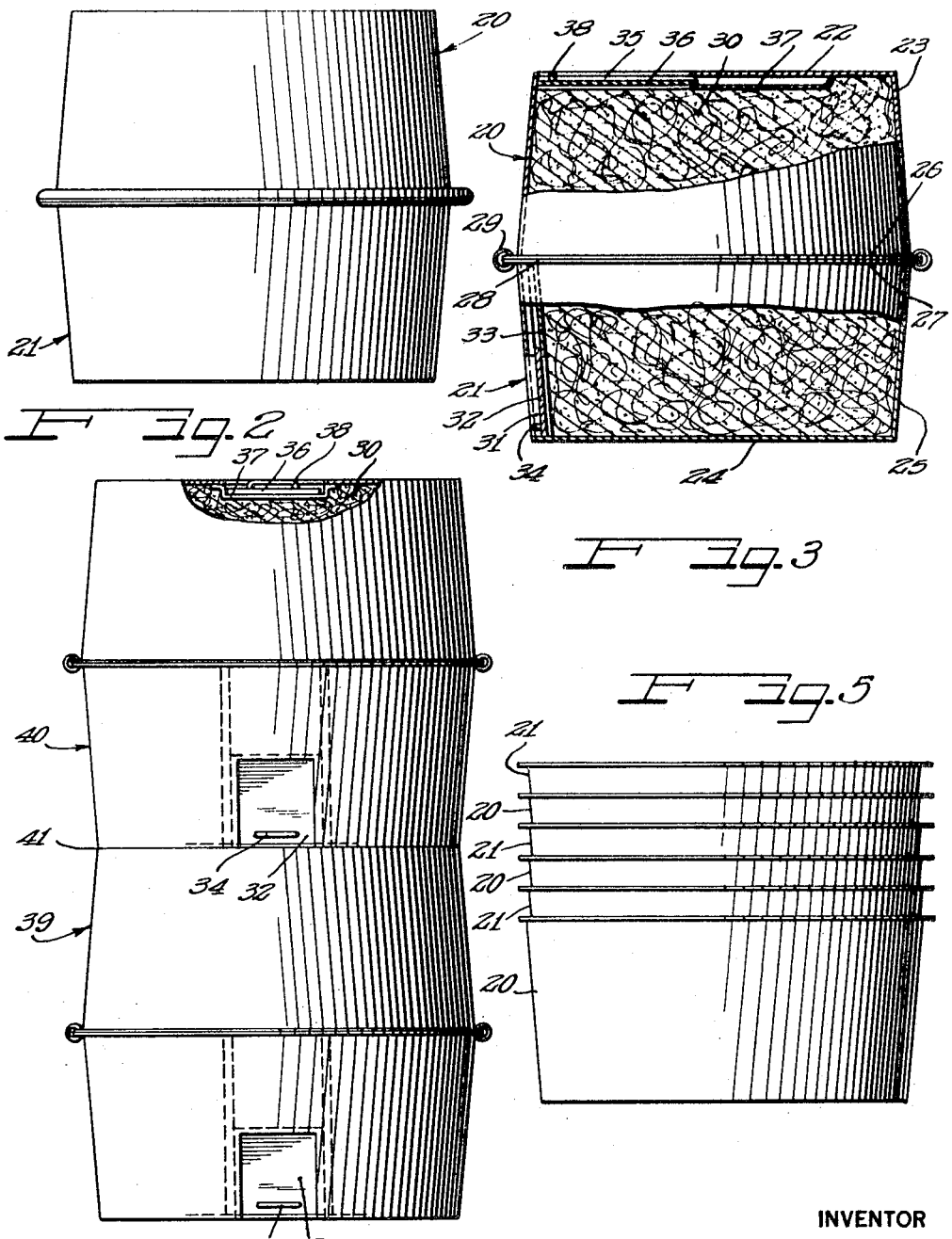

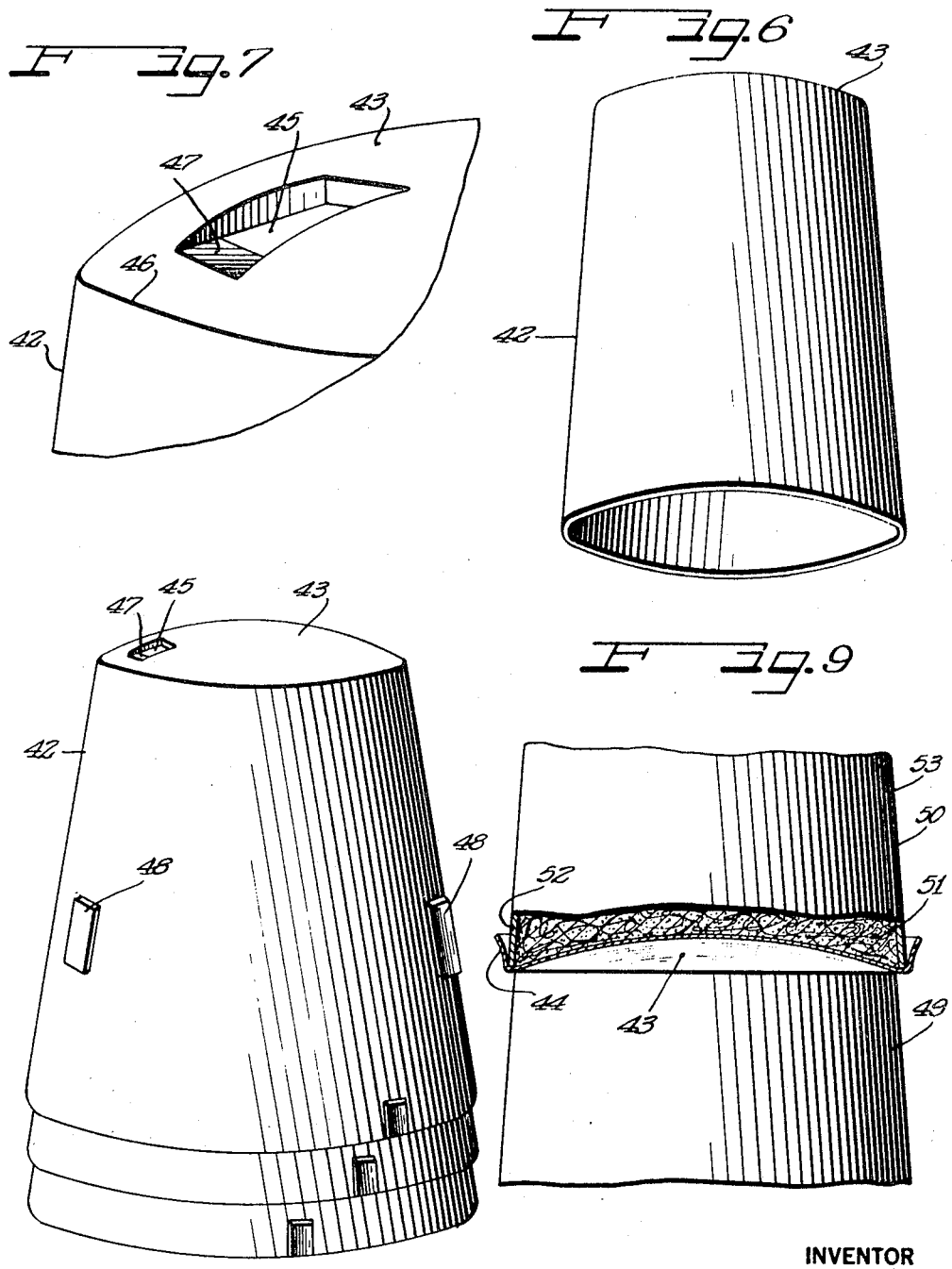

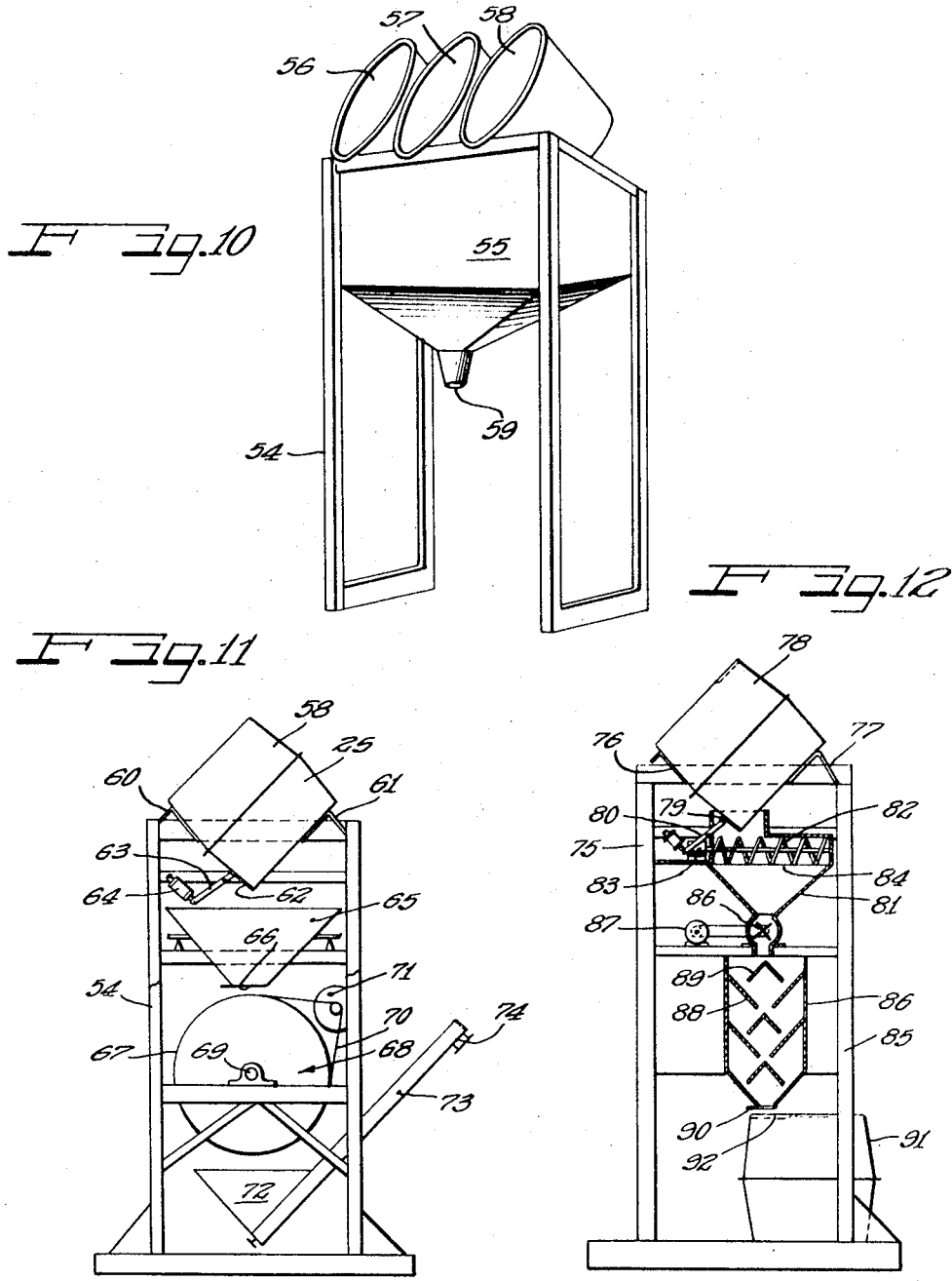

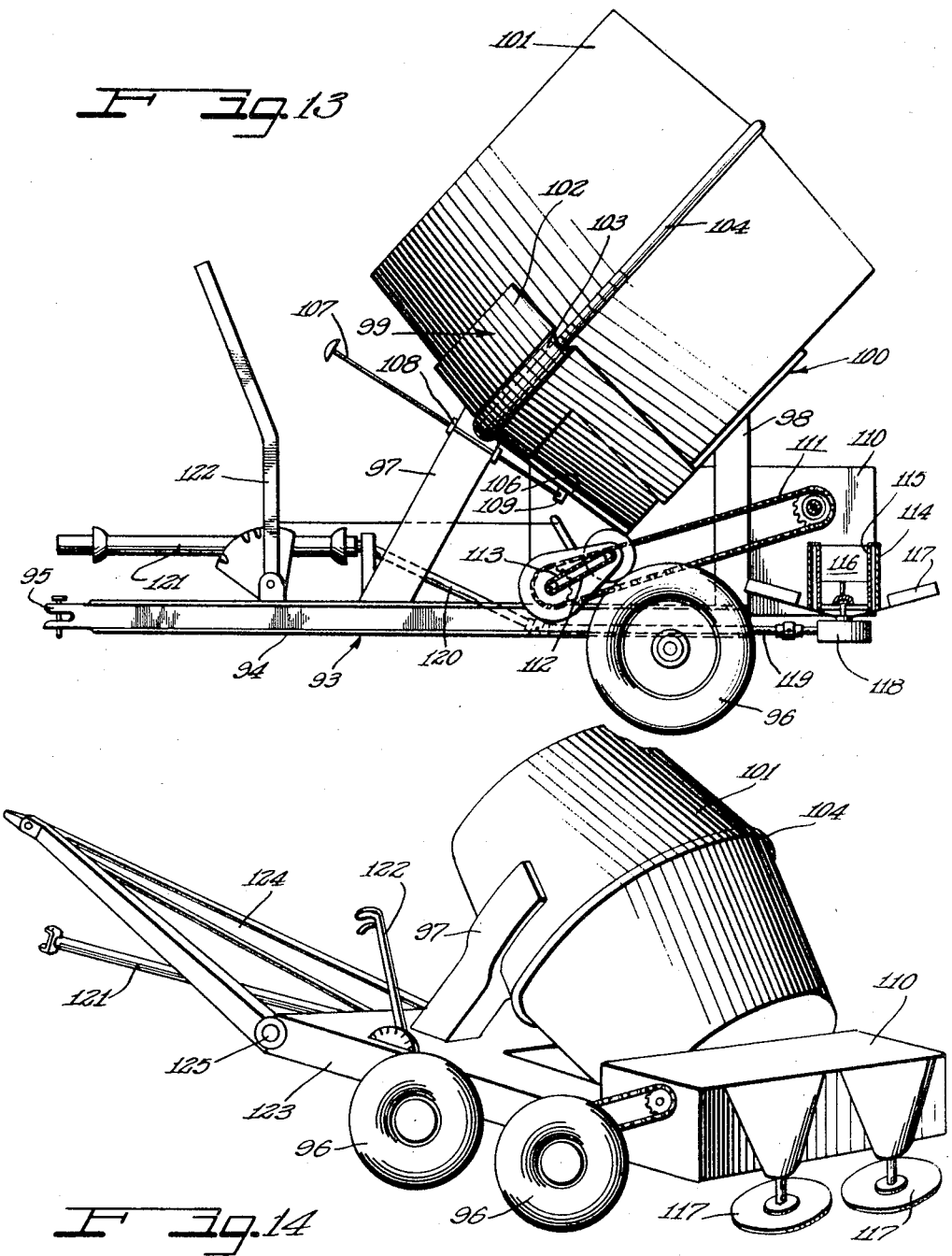

United States Patent Office 3,469,742
Patented Sept. 30, 1969

3,469,742
FERTILIZER PLANT
Donald L. Miller, 701 12th St. N., Benson, Minn. 56215,
James H. Paul, Atlanta, Ga. (2438 Tanglewood Road,
Decatur, Ga. 30033), and Sherman W. Kavanaugh,
Benson, Minn.; said Kavanaugh assignor to said Miller
and said Paul.
Original application Oct. 23, 1965, Ser. No. 503,145, now
Patent No. 3,385,478, dated May 28, 1968. Divided and
this application May 18, 1967, Ser. No. 651,068
Int. Cl. B65b 1/32
U.S. Cl. 222—30
5 Claims

ABSTRACT OF THE DISCLOSURE

A bulk materials handling plant having a rack for supporting transport containers over a hopper with weighing, recording and control for the discharge of the material into the hopper. The material is then blended, and repacked into other containers for further use.

This is a division of application Ser. No. 503,145, filed Oct. 23, 1965, now Patent No. 3,385,478 of May 28, 1968.

This invention relates to a bulk material handling, storage and dispensing plant, and in particular to a plant having as its prime function the preparation and distribution of bulk materials such as chemical fertilizers to a use location such as a farm or farm areas.

According to this invention, the efficiency and quality of the production and distribution of bulk chemicals such as fertilizers has been significantly increased, Fertilizers, for example, must be moved in large quantities to service a typical farm area. Furthermore, fertilizers must be handled many times before reaching the final destination or area of application. First, the fertilizer is shipped to a central distribution or service center either in bulk or bagged form. It may then require mixing or blending to meet the farmer's specific crop and soil requirements. The fertilizer is then re-packaged and moved to the farm location where it must be transferred to a spreader device and finally applied to the ground locations.

In addition to the excessive handling of large fertilizer quantities which is costly in lost time, both in the plant and on the farm and which is also costly in lost material, fertilizer at a distribution center may be required to be stored for extended periods which either requires expensive storage facilities or which results in lost material due to moisture or other deterioration or contamination.

In contrast, this invention contemplates as a principal object the elimination of excessive handling of bulk materials, such as fertilizers, and also contemplates the elimination of lost material due to excessive handling or extensive storage of unsatisfactorily packaged products.

It is also a principal object of this invention to provide a fertilizer plant which may be readily and efficiently moved from location to location without the loss of materials and with minimum handling charges.

It is a more specific object of this invention to provide a standardized transport container for the storage, transportation, and distribution of large fertilizer quantities which is rigid and weather-proofed in structure and which is adaptable to be used directly with mixing and spreading machinery.

It is another object of this invention to provide a transport container having tapered side walls which permit internal or telescope stacking of empty containers and which is provided with a dispensing port and associated gate means which is recessed within the container wall for eliminating interference during stacking of empty containers.

It is also an object of this invention to provide a transport container having tapered side walls to permit internal stacking of empty containers and having respective convex and concave end walls to permit interfitted or locked tier stacking of full containers.

It is a further object of this invention to provide a spreader device which is adaptable for receiving each of the above specified standardized containers directly thereto and which uses such container as a storage reservoir from which bulk materials may be drawn and dispensed to the use location.

Another principal object of this invention is to provide a device for spreading fertilizer materials to a use location which is adapted for receiving a transport container directly thereto as a dispensing source and which utilizes a conveyor for moving fertilizer materials from a receiver hopper to a metering or dispensing location.

It is also an object of this invention to provide a blender or mixer mechanism which is adapted to receive a number of standardized transport containers directly thereto and which blends or mixes the contents of these containers in a desired ratio and which packages the resulting mixture into a further transport container.

It is also an object of this invention to provide a blender device which is adapted for mixing the contents of standardized transport containers, which employs a scale hopper for measuring desired quantities of content material, which utilizes a rotary type mixer and an associated receiver hopper and which employs a conveyor means for delivering the mixed materials to a waiting transport container.

It is an additional object of this invention to provide a blender or mixer device which is adapted for directly receiving a plurality of standardized transport containers, which has means for directly engaging the gate of those containers, which employs an auger-type cross conveyor for eliminating caked or massed materials from the mixture components and which utilizes a rotary feeder and a plurality of baffles for mixing the content material and for delivering that material directly to a waiting transport container.

It is yet another object of this invention to provide a bulk blending or chemical storage and distribution plant which utilizes standardized transport containers as described above and which has mechanical grasping and lifting means adapted for handling and moving those containers from location to location within the plant area, which employs a blender mechanism as described above for receiving transport containers directly from the mechanical lifting and handling means, and which is equipped with a plurality of spreader devices for receiving standardized transport containers directly thereto wherein those spreader devices may be delivered directly to a farm site for the dispensing and spreading of content material therefrom to a final use location.

These and other features, objects and advantages of the present invention will be understood in greater detail from reference to the following specification and the associated drawings wherein reference numerals are utilized in designating illustrative embodiments and wherein:

FIGURE 1 illustrates a fertilizer plant showing the standardized transport containers of this invention and illustrating the cooperative association between those containers and a mechanical lifting and handling means, a mixer or blender mechanism, and spreader devices designed to be moved directly to the farm or use location;

FIGURE 2 is an elevated view of a transport container according to this invention illustrating tapered wall construction utilized for internal stacking of empty containers;

FIGURE 3 is a partially sectioned view of a transport container as shown in FIGURE 2 showing the wall and dispensing gate structures;

FIGURE 4 shows tier stacking of fully laden transport containers as shown in FIGURE 2;

FIGURE 5 illustrates internal stacking of empty half-section containers as shown in FIGURE 2 and as made possible via the tapered wall construction of the container sections;

FIGURE 6 is an elevated view of an alternate transport container having the features of the present invention and utilizing a single piece tapered wall structure;

FIGURE 7 is a partial elevated view of the end or top wall of the transport container shown in FIGURE 6 and illustrates the positioning of a dispenser port and associated sliding gate;

FIGURE 8 is an elevated view illustrating internal stacking of the alternate transport container shown in FIGURE 6;

FIGURE 9 is a partial elevated view of two transport containers stacked in a tier relationship and emphasizing the interlocking feature of the cooperable convex and concave container end walls;

FIGURE 10 is an elevated simplified view of a blender or mixer device according to the specification of this invention and showing the mounting of three transport containers having content materials to be mixed or blended according to a selected ratio;

FIGURE 11 is a diagrammatic representation of the internal elements of the blender or mixer as shown in FIGURE 10 and illustrating a rotary drum type mixer;

FIGURE 12 is a view similar to that of FIGURE 11 and illustrates an alternate embodiment of the mixing or blending elements;

FIGURE 13 is an elevated view of a spreader device and an associated transport container having a partial cutaway section for showing the internal elements of a receiver hopper, and FIGURE 14 is a perspective view of the spreader device and associated transport container as shown in FIGURE 13.

This invention contemplates the use of a standardized transport container or bulk material capsule which may be employed directly for a variety of operations characterizing a typical fertilizer or bulk material handling plant. The standardized transport containers of this invention are of rigid construction and are weatherized to protect the content material from outside storage conditions. These rigid containers make handling of large quantities of fertilizer more efficient and eliminate associated wasted material due to breakage of bagged products or contamination of bulk or loose materials. Furthermore, these standardized containers are designed with associated equipment to be directly adaptable to various operation devices and to thereby eliminate the repetitive transfer of bulk fertilizer materials from vessel to vessel.

An illustrative embodiment of the transport container of this invention is shown in FIGURE 2 and comprises generally upper and lower half-sections 20 and 21 respectively which are joined to form the completed enclosure. As shown in FIGURE 3, the upper half-section 20 has a top or end wall 22 and a tapered or truncated conical side wall 23. Similarly, the lower section 21 has a bottom or end wall 24 and a tapered side wall 25. The upper and lower sections 20 and 21 are provided with junction flanges or rims 26 and 27 respectively which are joined as at 28 to form the completed enclosure. The unit is maintained in assembled relationship via a split ring or clamp 29 which is extended about the rims 26 and 27 as shown in the diagram.

Content material 30 may be packaged or dispensed from the transport container, through the provisioned for dispensing ports and slidably mounted gates suitably disposed within the container walls. Two gates are utilized in this embodiment. First, a dispensing port 31 is formed within the tapered side wall 25 of the lower half-section 21 and a gate 32 is slidably mounted within a rack 33 which is recessed internally of the transport container. The gate 32 may be operated by a knob or lever 34 extending from the outer surface of the gate but which is also recessed from the outer surface of the tapered conical wall 25. This recess provision for the gate 32 and its operational lever 34 will be seen to be useful to permit internal stacking of empty container elements.

A second dispenser port 35 is formed within the upper end wall 22 of the upper half-section 20. The port 35 is opened and closed by a slidably mounted gate 36 similar to the gate 32 associated with the port 31. As in the previous example, the gate 36 is slidably mounted within a rack 37 and is provided with a knob or lever 38 for being actuated thereby. Also, as in the previous case, the gate and actuating knob are recessed below the associated wall which for the port 35 is the end wall 22.

FIGURE 4 shows the stacking of transport containers as shown in FIGURE 2 and FIGURE 3, while those containers are fully laden with content material 30. In FIGURE 4, the containers 39 and 40 are mounted in tiers at a junction point 41. It is apparent therefore that the provision for the recessed gate 35 aids in the efficient tier stacking of full containers by providing a smooth mounting surface for the subsequent level of the tier structure.

In FIGURE 5 internal stacking of empty container half-sections is shown and in particular upper and lower half-sections 20 and 21 respectively are shown to be alternately receivable within the stacking assembly. As in FIGURE 4, it is apparent in FIGURE 5 that the recessed provision for the gate 32 and the knob or lever 34 aids in the efficient internal stacking of the container elements by avoiding interference at the tapered or conical side walls 25.

An alternate standardized transport container as may be utilized in this invention is shown in FIGURES 6 through 9. In FIGURE 6, the stanardized container is shown to comprise a single tapered side wall 42, a convex configured end wall 43 and a second end wall 44 having a concave configuration which is provided to be substantially mating with the contour of the end wall 43.

As in the transport container embodiments shown in FIGURES 2 through 5, the transport container of FIGURE 6 is provided with a dispenser port 45 formed within the upper or convex shaped end walls 43 and is provided to be positioned adjacent to the edge 46 which is the junction between the tapered or conical side wall 42 and the convex end wall 43. The dispensing port 45 is also provided with a slidably mounted gate 47 which is disposed similarly as the gate shown in FIGURE 3. As has been noted, the transport containers are provided to be weather-resistant and in fact substantially air-tight in that the slidably mounted gates are gasketed in the usual manner to accomplish the intended purpose.

The conical or tapered wall structure as shown in FIGURE 6 is utilized to permit efficient or internal stacking of the containers similar to the stacking shown in FIGURE 5. Such internal stacking is shown in FIGURE 8 and may be accomplished by removing the concave end wall 44 and telescoping successive containers about the tapered wall 42. It may be noted in FIGURE 8 that the containers there shown are provided with positioning structures or lugs 48 which may be utilized in adapting the standardized container to various operational devices employed within a typical fertilizer or bulk material handling plant.

The provision for the mating convex and concave end walls is apparent in FIGURE 9 where successive containers 49 and 50 are shown in a tier stacking arrangement while fully laden with content material 51. In FIGURE 9 the upper container 50 is equipped with the concave wall cover 44 which is snap-fitted about the lower extremity 52 of the tapered wall 53. The cover may be bolted or fastened by other suitable means to provide a sealed environment for the content material 51. The concave cover 44 is then received about the convex or dome surface 43 of the lower container 49.

Since the convex and concave surfaces 43 and 44 are provided to be substantially mating, it is apparent from FIGURE 9 that the tier stacking arrangement of the fully laden containers are appreciably interlocked to provide a rigid structural assembly. This interlocking feature is particularly to be appreciated when the size and weight of the transport containers are considered. In particular, the containers shown in these figures as well as the containers illustrated in FIGURES 2 through 4 are provided to be substantially six feet in diameter and height and to hold approximately four tons of fertilizer materials.

An important operational device to a fertilizer plant is a blender or mixer mechanism whereby several content materials may be combined to form a given composition having a specified ratio of the individual elements. A blender structure as used in the fertilizer plant of this invention is shown generally in FIGURE 10 as comprising a main supporting frame 54 and a mixing and dispensing housing 55. The frame 54 has a conventional structure as is well understood in the art, but the structure must be provided to sustain the substantial load of several full transport containers participating in the mixing function. In the embodiment shown in FIGURE 10, three transport containers 56, 57 and 58 are shown positioned for being emptied into the mixer mechanism and for ultimately being dispensed in the form of a combined or composition mixture through a dispensing spout 59 of the blender assembly. It is apparent, therefore, that the frame structure 54 must be engineered to sustain the weight of the blender mechanism and in addition to support approximately 12 tons of content material as exemplified by the transport containers 56, 57 and 58.

A more detailed view of a blender mechanism according to this invention is shown in FIGURE 11 which displays the inter-relationships between the working components of the blender assembly. In FIGURE 11, the frame structure 54 is provided with a series of container saddles 60 and 61 which are rigidly mounted to the upper portion of the frame in a well understood manner for supporting the transport container 58. It is understood that while the transport container 58 is similar to the containers shown in FIGURES 2 through 5, that the blender mechanism as employed in this invention may be adapted to receive the container illustrated in FIGURES 6 through 9 or a plurality of other containers having features similar to those associated with the illustrated embodiments.

As shown in FIGURES 3 and 4 the container 58 is provided with a dispenser port and gate formed within the conical or tapered wall 25. In FIGURE 11 the dispensing gate is shown at 62 and is provided to be cooperable for being opened and closed by a lever mechanism 63 which may be either hydraulically operated as at 64 or operated by a suitable alternate power source.

With the gate 62 of the transport container 58 in an opened position content material will flow from the container to a scale hopper 65 which is operably mounted below the position of the respective container. The scale hopper 65 is provided to weigh the content material according to specified ratios as is well understood. When the proper quantity of the individual materials is received within the scale hopper 65, the material is caused to flow through a spout 66 formed at a lower extremity of the hopper 65. Material flowing through the spout 66 will then be brought into contact with the rotating surface 67 of a mixing drum 68.

The drum 68 is rotatably mounted about a shaft 69 and is driven through a chain or V-belt 70 by a motor 71 which is mounted to the frame structure 54. The rotary motion of the drum 68 is sufficient to blend the respective components and to provide a uniform mixture which is received at a collector or receiver hopper 72 positioned at the base of the blender mechanism and aligned directly beneath the rotating drum 68. Material collected within the receiver hopper 72 is then conveyed through a conveyor mechanism 73 to a final dispensing spout 74 which may be used to transfer the uniform blended mixture to a waiting transport container similar to the containers 56, 57 and 58 as originally used to supply the constituents of the final fertilizer mixture.

FIGURE 12 shows an alternate embodiment of the blender or mixer device illustrated in FIGURE 11 and comprises a supporting frame 75 having saddle members 76 and 77 for supporting the transport container 78. The transport container 78 is provided with a dispenser port and gate 79 operable by a lever mechanism 80 similar to the mechanism 63 of FIGURE 11.

The opening of the gate 79 of the transport container 78 allows the flow of content material from that container to a receiver hopper 81 having an auger-type cross conveyor mechanism 82 operated by a motor 83. The cross conveyor 82 cooperates with a screen bottom 84 for crushing chunked or massed content material which is received directly from the transport container 78.

The refined content material passes from the receiver hopper to a feed chamber 85 having a rotary feed blade 86 operably mounted therein and driven by a motor 87 in the usual manner. The rotary blade 86 causes a feed of the content material from the receiver hopper 81 to a mixer hopper 86 at a rate dependent only upon the speed of the motor 87.

The blender hopper 86 is provided with a series of baffle combinations 88 and 89 which serve to deflect the downward passage of content material in such a manner as to perform a mixing function similar to that performed by the rotary drum 68 of FIGURE 11. The content material then passes from the blender hopper 86 through a spout 90 to a waiting transport container 91 properly orientated within the support blender frame 75 for receiving the mixed composition material through a dispenser port 92.

It is apparent from considering FIGURES 11 and 12 that the standardized transport container of this invention offers significant handling advantages in the mixing or blending process. Principally, the handling of bulk materials is eliminated and the transport container becomes both the supply for the mixing device and the receiving receptacle for the mixed composition materials. Through this increased handling and mixing efficiency, it is possible to transport as few as three fertilizer materials to a central service or distribution area and to satisfy the entire varied needs of the area concerned by mixing the individual fertilizer materials at the required mixing ratios. Therefore, through the use of the standardized transport container, the mixing or blending of fertilizer materials in the immediate vicinity of the actual use locations is made possible providing greater flexibility and economy for the individual farmer's requirements.

Once the proper mixing ratios have been determined and the composition has been blended and transferred to a final transport container, the container may be positioned directly onto a spreader device which may be moved to the farm or use location without a further handling of the fertilizer materials.

A spreader device having the characteristics of this invention is shown in FIGURE 13 and comprises a spreader chassis 93 having structural support rails 94 which are equipped at one end with a trap door hitch 95 and at the rear end with an axle and wheel assembly 96. The chassis 93 has support arms 97 and 98 extending upwardly therefrom and terminating in support saddles 99 and 100.

The saddles 99 and 100 are provided to be complementary with the surfaces of the transport drum 101 which is received therein. As shown in FIGURE 13, the saddle 99 comprises a broad plate 102 having a rim 103 for being complementarily received about the rim 104 of the transport container 101. The plate 102 is provided with a cut-away section defined by the edges 105 which make provision of utilizing the dispensing port and associated gate 106 for transferring content material from the container 101 to the spreader device.

The opening of the gate 106 is controlled by a lever 107 which is mounted by a bracket 108 about the support 97 extending from the spreader chassis 93. The lever 107 is cooperable with the gate at a point 109 and is provided to maintain the gate at any desired opening position for controlling the rate of flow of content material from the transport container 101.

Content material transferred from the container 101 is received within a hopper 110 which is fixedly mounted to the spreader chassis 93. The content material received within the hopper 110, however, is caused to move rearwardly of the spreader device by a conveyor mechanism 111 which is geared through a secondary linkage 112 directly to the rotation of the wheel assembly 96 via a drive wheel 113.

Content material as received within the hopper 110 is moved by the conveyor 111 rearwardly and upwardly for disposing the material within a metering hopper 114. The metering hopper 114 is provided with an inner sleeve 115. The sleeve 115 and the hopper 114 have slots 116 formed therein which may be opened or closed by altering the relative position of the sleeve 115 and the hopper 114. Any intermediate position may be possible thus providing through the sleeve 115 a further means of controlling the rate of flow of content material from the spreader device to the outside.

Content material passing through the slots 116 of the metering hopper 114 are received by a spreader blade 117 which is operably connected beneath the hopper 114 and which is powered through a drive mechanism 118 by a series of linkages 119, 120 and 121 which may be connected directly to the power take-off unit of a tractor or other prime mover.

It is apparent in considering the diagram of FIGURE 13 that the ultimate flow of content material to points external of the spreader device is effected in several manners. First, the aperture of the dispensing port as provided by the gate 106 and the gate control 107 determines the rate of flow of content material to the receiver hopper 110. Second, the forward speed of the vehicle is directly linked through the chain mechanism 112 and 113 to the conveyor 111 for determining the feed of content material from the receiver hopper 110 to the metering hopper 114. It is well understood that an increased speed of feed is desirable for increased forward speeds of the spreader device to maintain a consistent spread of content material. Finally, the flow of content material is effected by the apertures provided by the slots 116, and, ultimately, the pattern of the spread content material is effected by the configuration and speed provided for the spreader blade 117.

The transport container 101, therefore, through the use of the spreader mechanism of FIGURE 13, further eliminates handling of the bulk content material which would be necessary in transferring from a bagged product to a receiver hopper of a conventional spreader device. The transport container 101, therefore, is not only a means of shipping large quantities of content material without material loss or contamination, is not only a means of storage of weather susceptible materials without special provision for warehousing or other weather protection, is not only a means for economically mixing and blending various fertilizer components to a specified mixing ratio, but is also a direct means for applying the fertilizer or other content material directly to the use location which is typically farm or associated lands.

In further considering the spreader device of FIGURE 13, it is desirable to recognize that though the device indicated in the drawings is intended to be pulled by a tractor or truck or other prime mover, that the spreader itself may be provided with its own propulsion system and become a self-sufficient farm tool. It is further to be understood that the spreader device incorporating a self-propulsion system may be driven directly along the roadway from a central distribution plant to the farm location for being applied to the farm land and returned to the distribution center. In this connection, a means is provided for engaging and disengaging the drive wheels similar to a transmission. Such a means might take the form of a lever type mechanism 122 as shown in FIGURE 13. In the device of FIGURE 13, the lever 122 may be utilized to engage or disengage the drive wheels of the spreader device.

A somewhat modified embodiment of the spreader device of FIGURE 13 is shown in FIGURE 14. Particularly, the spreader device of FIGURE 14 is provided to have a tandem wheel support for giving greater stability to the large weight concentration of the transport container being carried over relatively rough farm terrain. Also, in FIGURE 14 the support structure for the spreader device, namely the structure 123, is formed to be independent of the hitch mechanism 124. The hitch structure 124 is pivotally mounted at a point 125 to the main spreader support structure and thereby provides further stability to the connected assembly of the spreader device and the tractor or other prime mover. In other respects the spreader mechanism of FIGURE 14 is similar to that described in FIGURE 13, and many reference numerals have been carried forward to FIGURE 14 to designate the principal parts thereon.

Finally, reference to FIGURE 1 provides a general understanding of the inter-relationship of the standardized transport container of this invention and the associated handling and operating devices and structures which are incorporated within a single fertilizer or bulk blending plant as described herein. Reference to FIGURE 1 emphasizes the simplicity of the plant structure, the ease of mobility of the transport containers within the plant, the efficiencies and the economies resulting from the ease of mobility of the transport containers, the added flexibilty of having such a central fertilizer plant or distribution center located immediately within the area of the farm lands to be served, and finally the ready mobility of the entire plant system itself should a given plant location prove undesirable or otherwise unnecessary to service the farm locality.

In FIGURE 1 a plurality of transport containers 130 are shown in a storage position, and it is to be emphasized that the containers themselves each hold approximately four tons of storage material, and, as described above, the containers are weatherized for the type of open storage here illustrated. The transport containers are to be moved throughout the plant facility by a mechanical lifting and grasping device 131. The lifter or loader 131 may be of a standard variety and may be provided with a cooperable grasping mechanism 132 for more efficiently transferring the transport containers from location to location within the plant facility.

Transport containers 133, 134 and 135 are shown in FIGURE 1 to be positioned within the blender device 136 for being mixed or blended according to a predetermined ratio as explained in connection with the blender of this invention.

Transport containers 137, 138, 139 and 140 may illustrate containers which hold blended or mixed composition material and which await being mounted on associated spreader devices 141 as described above. The transport containers 142 and 143 are shown mounted on their respective spreader devices and are in preparation for being moved to a farm location. Movement of the spreader system including the transport containers 142 and 143 may be accomplished by a nearby railroad system or by highway and trailer methods.

Once the content material is applied to the farm areas through the spreader device of this invention, the transport containers may be separated in the manner indicated in connection with FIGURES 2 through 5 and efficiently stacked internally or in a telescoped manner for being transported back to a principal fertilizer producing industry. The empty containers are then re-packaged at the central industry and then re-distributed to fertilizer plants at the given locality as shown in FIGURE 1. The cycle is then complete and the farmer has received at a reduced cost an improved fertilizer component free from contamination and waste and which is tailor-blended to meet his specific needs. The farmer has also saved on-the-farm handling of fertilizer materials by using the standardized containers and spreader devices which may be returned to a central location after use.

It will be understood that minor modifications of the above-described invention can be accomplished without departing from the spirit and scope of our invention, and we desire to claim all such modifications as properly come within the scope of our contribution to the art.

We claim as our invention:

1. In a bulk blending plant utilizing transport containers, a device for blending content material from several containers comprising:
   a structural framework for supporting a plurality of transport containers,
   a plurality of saddles arranged upwardly of said framework for holding a number of transport containers simultaneously at a proper angle for gravity dispensing the content material therefrom,
   said transport containers having dispenser gates, means extending to said dispenser gates for releasing the material from the containers as disposed within said saddles,
   a scale hopper mounted within said framework beneath said saddles for receiving content material as dispensed from the transport containers disposed therein,
   a mixer mechanism disposed beneath said scale hopper for mixing the content materials released from said scale hopper, and
   a receiver hopper mounted below said mixer mechanism for gathering the mixed content materials released therefrom.

2. In a fertilizer plant utilizing transport containers, a device for blending content material from several containers comprising:
   a structural framework for supporting a plurality of transport containers having dispenser gates,
   plurality of saddles arranged upwardly of said framework for holding a number of transport containers simultaneously at a proper angle for gravity dispensing the content material therefrom,
   a lever mechanism mounted at said framework and extending to a dispenser gate on said transport containers disposed within said saddles to release content material therefrom,
   a scale hopper mounted within said framework beneath said saddles for receiving content material as dispensed from the transport containers disposed therein,
   means for registering the weight of content material within said scale hopper and for releasing the contents thereof,
   a mixer mechanism disposed beneath said scale hopper for mixing the content materials released from said scale hopper,
   a receiver hopper mounted below said mixer mechanism for gathering the mixed content materials released therefrom, and
   means conducting content material from said receiver hopper to a transport container.

3. A blending device as described in claim 2 wherein mixer mechanism comprises a rotary drum mounted beneath said scale hopper and having a rotating surface disposed for receiving the content material discharge from said scale hopper and for moving the discharge material in a circular path to develop a uniform mixture at said receiver hopper.

4. A blending device comprising:
   a vertical blending framework for supporting a plurality of transport containers and for maintaining a series of blending components in a vertical or gravity fed relationship,
   said containers having dispenser gates,
   a saddle disposed upwardly of the framework for supporting said transport containers in a position for being gravity emptied,
   means extending to said gates for opening the same,
   a scale hopper for receiving individual materials from separate transport containers,
   a rotary mixer for uniformly mixing the separate materials as discharged from said scale hopper, and
   means for gathering mixed materials from said rotary mixer and for loading the materials into a transport container.

5. The combination comprising:
   a number of transport containers each having a dispenser port and a slidably mounted gate for controlling the flow of content material from the container,
   a material handling device having a structural framework for supporting said number of said transport containers,
   a lever mechanism mounted on said framework and being engageable with the gates of each of said transport containers for opening said gates and controlling thereby the dispensing rate from said containers,
   means for weighing specific amounts of content materials from said transport containers, for mixing said materials to a uniform blend and for repackaging the materials into transport containers for shipment to a distribution or storage area.

References Cited

UNITED STATES PATENTS

| 1,324,312 | 12/1919 | Herrmann | 222—145 |
| 1,938,126 | 12/1933 | Thompson | 211—7 X |
| 3,091,369 | 5/1963 | Sackett | 222—145 X |
| 3,217,927 | 11/1965 | Bale et al. | 222—145 X |
| 3,244,312 | 4/1966 | Lawson | 220—5 |

ROBERT B. REEVES, Primary Examiner

H. S. LANE, Assistant Examiner

U.S. Cl. X.R.

214—300; 222—77, 132, 145, 185, 505; 248—146